United States Patent
Bornard (10) Patent No.: US 10,520,621 B2
(45) Date of Patent: Dec. 31, 2019

(54) METHOD AND APPARATUS FOR SIMULTANEOUS GEOSTATISTICAL INVERSION OF TIME-LAPSE SEISMIC DATA

(71) Applicant: CGG SERVICES SAS, Massy (FR)

(72) Inventor: Raphael Bornard, Leiden (NL)

(73) Assignee: CGG SERVICES SAS, Massy (FR)

( * ) Notice: Subject to any disclaimer, the term of this patent is extended or adjusted under 35 U.S.C. 154(b) by 94 days.

(21) Appl. No.: 15/597,311

(22) Filed: May 17, 2017

(65) Prior Publication Data

US 2018/0143336 A1 May 24, 2018

Related U.S. Application Data

(60) Provisional application No. 62/425,682, filed on Nov. 23, 2016.

(51) Int. Cl.
*G01V 1/30* (2006.01)
*G01V 1/28* (2006.01)

(52) U.S. Cl.
CPC .............. *G01V 1/306* (2013.01); *G01V 1/282* (2013.01); *G01V 1/308* (2013.01); *G01V 2210/612* (2013.01); *G01V 2210/614* (2013.01); *G01V 2210/626* (2013.01); *G01V 2210/6242* (2013.01); *G01V 2210/6244* (2013.01); *G01V 2210/6246* (2013.01); *G01V 2210/6248* (2013.01)

(58) Field of Classification Search
CPC ......... G01V 1/282; G01V 1/306; G01V 1/308
See application file for complete search history.

(56) References Cited

U.S. PATENT DOCUMENTS

| 6,480,790 B1* | 11/2002 | Calvert ................. G01V 1/282 702/14 |
| 6,906,981 B2 | 6/2005 | Vaage |
| 8,681,581 B2 | 3/2014 | Moldoveanu et al. |
| 8,711,654 B2 | 4/2014 | Moldoveanu et al. |
| 9,075,162 B2 | 7/2015 | Baardman et al. |
| 2009/0164188 A1* | 6/2009 | Habashy ................. E21B 43/00 703/10 |
| 2014/0297187 A1* | 10/2014 | Miotti ................. G01V 11/002 702/13 |

(Continued)

FOREIGN PATENT DOCUMENTS

| WO | 2013105075 A1 | 7/2013 |
| WO | 2015/014762 A2 | 2/2015 |
| WO | 2015/092542 A2 | 6/2015 |

OTHER PUBLICATIONS

Leon Barens et al., "Joint Geostatistical Inversion of Time-Lapse Data", EAGE 64 Conference & Exhibition, May 27-30, 2002.

(Continued)

*Primary Examiner* — Bryan Bui
(74) *Attorney, Agent, or Firm* — Patent Portfolio Builders PLLC (57) ABSTRACT

Properties of underground formations are obtained by performing simultaneous geostatistical inversion of two or more seismic datasets acquired over the same area. These methods enable simultaneous estimating quantitative changes in a hydrocarbon-producing field.

20 Claims, 6 Drawing Sheets

(56) References Cited

U.S. PATENT DOCUMENTS

2017/0235003 A1 8/2017 Elboth et al.
2018/0052248 A1 2/2018 Beitz et al.

OTHER PUBLICATIONS

James Gunning, "Delivery4D: an open-source model-based Bayesian seismic inversion program for time-lapse problems", Jul. 5, 2013, pp. 1-37.
Y. Lafet et al., "Global 4-D seismic inversion and time-lapse fluid prediction", Eleventh International Congress of the Brazilian Geophysical Society, Aug. 24-28, 2009, pp. 1927-1930.
Baardman, Rolf, et al.; "A simulated Simultaneous Source Experiment in Shallow waters and the Impact of Randomization Schemes"; SEG Houston 2013 Annual Meeting;2013; pp. 4382-4386.
Baardman, Rolf, et al.; "Separating Sources in Marine Simultaneous Shooting Acquisition—Method & Applications"; SEG Las Vegas 2012 Annual Meeting; 2012; pp. 1-5.
Bosch, M., et al.; "Seismic inversion for reservoir properties combining statistical rock physics and geostatistics: a review"; XP001557880; Geophysics, Society of Exploration Geophysicists, US; vol. 5, No. 5, Sep. 1, 2010; pp. 75A165-75A176.
Buland, A., et al.; "Bayesian Time-Lapse Inversion"; Geophysics Society of Exploration Geophysicists, XP001243674; US vol. 71, No. 3; May 1, 2006; pp. R43-R-48.
Extended European Search Report in European Application No. EP 17 30 6569 dated Apr. 13, 2018. (All references not cited herewith have been previously made of record.).
Fromyr, E.; "Blended Acquisition—A potential step-change in geophysical flexibility and operational efficiency"; SBGf; 15th International Congress of the Brazilian Geophysical Society; Jul. 31-Aug. 3, 2017; pp. 768-771.
Moldoveanu, N., et al.; "Random sampling: A New Strategy for Marine Acquisition"; SEG Denver 2010 Annual Meeting; pp. 51-55.
Rijo, Pedro; "Geostatistical Inversion of Time-Lapse seismic data"; Geostatistical Reservoir Modeling, XP055464553 , May 28, 2014; pp. 10-16.

* cited by examiner

METHOD AND APPARATUS FOR SIMULTANEOUS GEOSTATISTICAL INVERSION OF TIME-LAPSE SEISMIC DATA

CROSS-REFERENCE TO RELATED APPLICATIONS

The present application is related to and claims the benefit of priority of U.S. Provisional Application 62/425,682 filed Nov. 23, 2016, the entire content of which is incorporated herein by reference.

BACKGROUND

Technical Field

Embodiments of the subject matter disclosed herein generally relate to methods and systems for time-lapse seismic data processing, and, in particular, to simultaneously perform geostatistical inversion of seismic datasets acquired at different survey times over at least a partially overlapping survey area.

Discussion of the Background

Seismic surveys are an important tool for learning about underground formations' structure made of volumes of materials with different properties. During a seismic survey, seismic excitations generated by one or more seismic sources are injected into the explored formation, and the response to the injected excitations emerging from the explored formation is sampled and recorded as seismic data by sensors (known as "receivers"). The seismic response is in part due to reflection and refraction of seismic excitations in the formation occurring when properties changes impact seismic wave propagation. Seismic data processing techniques are applied to the seismic data to extract structural information, enabling generation of an image of the explored formation.

Seismic inversion methods are seismic data processing techniques for obtaining elastic properties of materials on the seismic excitation's path between the source and the receiver. Such elastic properties are P-wave (or compressional) velocity $V_p$, S-wave (or shear) velocity $V_s$ and density $\rho$, or P-wave (or compressional) acoustic impedance $Z_p = V_p \times \rho$, or various combinations thereof. These elastic properties may then be used to determine other properties of interest, such as, porosity, fluid saturations, permeability, fraction of clay, facies and others. These properties of the rocks and fluids in the explored formation provide valuable information for locating hydrocarbon reserves in an exploration context, or for optimizing the recovery of hydrocarbon reserves in a production context. Most of the inversion methods are based on some forward model of seismic excitation propagation using initial elastic parameter values (e.g., in the form of low-frequency trend information or statistical distributions). Other inversion methods do not use initial elastic parameters, but use instead some calibration of seismic amplitudes, performed in a pre-processing step or as a part of an algorithm. Dependent on the seismic data acquisition geometries, estimates of properties related to rock and fluids along the propagation path obtained from any of these inversion methods may be output as series of two-dimensional (2D) sections or as three-dimensional (3D) volumes on which areas of different parameter values are indicated.

Seismic inversion methods can be broadly classified into two groups: deterministic inversion and stochastic inversion. Deterministic inversion methods produce a best estimate of the properties at a vertical resolution corresponding to the seismic data's limited bandwidth. They typically employ optimization techniques to minimize the difference between modeled (or synthetic) seismic data and the actual processed seismic data.

Stochastic inversion methods produce a multitude of alternative estimates (known as "realizations") of the properties with more vertical detail than deterministic inversion methods. All realizations yield synthetic seismic data that matches the measurements (i.e., seismic data and well logs), with the variations between the realizations capturing the uncertainty or non-uniqueness associated with the seismic inversion process. Stochastic inversion methods are typically based on a probabilistic framework called Bayesian inference, combining prior probabilities associated with properties values with the uncertainties associated with the seismic and well measurements to form a global posterior probability from which generated realizations are sampled.

Geostatistical inversion methods are a subset of stochastic inversion methods and use statistical models to represent the spatial continuity in properties between different locations in the estimated 3D volumes. The statistical models most frequently used for that are known as variograms. A variogram defines the variance or correlation in property values at two locations as a function of the distance vector between the two locations. Variogram-based modeling is used for the prior probabilities. An alternative to variograms employed in geostatistics are models known as multiple-point (or multipoint) statistics.

Various algorithms can be used in geostatistical inversion to generate realizations that honor all the input information. The most common ones are known as Sequential Gaussian Simulation (SGS) and Markov Chain Monte Carlo (MCMC).

Figure 1:
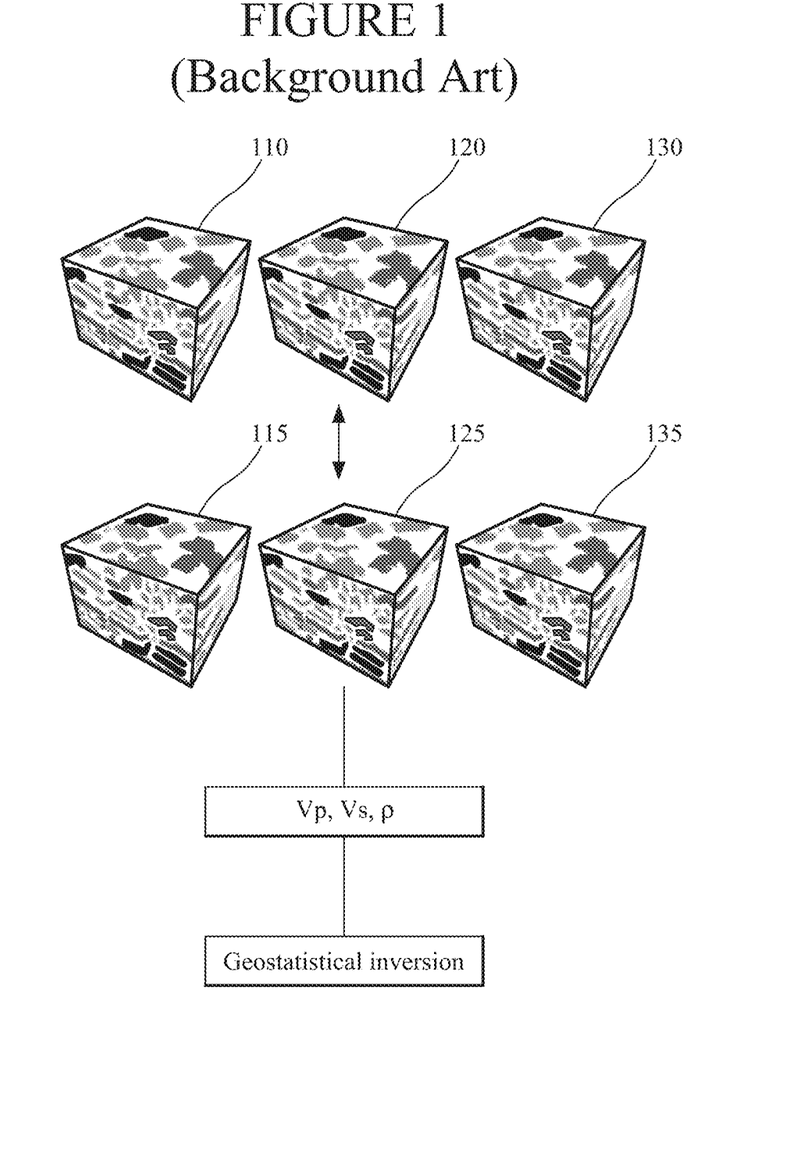
FIG. 1 is a schematic diagram of conventional geostatistical inversion.

FIG. 1 illustrates the meaning of geostatistical inversion honoring the processed seismic data. The pre-processed seismic data used as input to the inversion may be a single full-stack volume or partial offset or angle stack volumes or pre-stack seismic data. Although illustrated for three seismic volumes 110, 120 and 130, the seismic data can include any number of volumes. Uncertainties are also associated with the input seismic data to define probabilities known in the Bayesian formalism as likelihood. The properties generated as output to the geostatistical inversion are indicated as $V_p$ (P-wave velocity), $V_s$ (S-wave velocity) and $\rho$ (density) for illustration purposes, but could also be any equivalent combination of those elastic properties (including $V_p/V_s$ ratio, Young's modulus, Poisson's ratio, bulk and shear modulus, shear impedance, Lame parameters) or $Z_p = V_p \times \rho$ (acoustic impedance). Prior information specified for these properties are probability density functions (pdfs) and variograms. Geostatistical inversion generates multiple realizations of the properties. Synthetic seismic data according to a realization are illustrated as volumes 115, 125 and 135 corresponding to the seismic volumes 110, 120 and 130 in FIG. 1. Various methods may be employed to model seismic excitations' propagation when generating the synthetic seismic data. For example, the 1D convolutional model method convolves reflectivity series calculated using Zoeppritz equations or one of their approximations, with a one-dimensional operator known as the seismic wavelet. Geostatistical inversion generates realizations (i.e., sets of property values and spatial distribution thereof) that yield synthetic data compatible with the seismic data acquired during the survey. Compatibility means that the difference between the corresponding synthetic seismic data and the input processed seismic data is within the specified seismic uncertainty. In other words, the property values of a realization obtained from the geostatistical inversion are constrained by the seismic data.

When an oil or gas field is being produced, the reservoir's properties (such as fluid saturations and pressure) change as a direct consequence of hydrocarbon removal or, for example, due to the injection of water to aid in the removal. The changes in a reservoir's properties cause changes of the elastic properties in the underground formation encapsulating the reservoir, which result in changes in the seismic response. Therefore, seismic surveys are performed at different times to monitor changes in the reservoir due to hydrocarbon removal. Comparison of seismic survey datasets (known as "vintages") acquired at different survey times yields information on elastic properties' changes inside the surveyed underground formation. As seismic data acquisition geometries are often three-dimensional (3D), acquisition time can be viewed as a fourth dimension, and the different vintages form 4D seismic data. Using seismic inversion methods to identify changes in properties between vintages is known as 4D inversion.

The earliest seismic survey over a survey area is known as the base survey, and any subsequent seismic survey is called a monitor survey. Approaches to conducting 4D seismic inversion include (1) inverting datasets acquired during the base and monitor surveys separately, and then subtracting the monitor survey-related values from the base values to emphasize the changes in elastic properties, (2) using inversion results for a base survey to define an initial model then used for inverting a monitor survey, (3) inverting seismic amplitude differences directly for changes in elastic parameters, and (4) inverting all vintages simultaneously (referred to as simultaneous 4D inversion). Compared to other inversion approaches, simultaneous 4D inversion of the datasets acquired during the base and monitor surveys is expected to give better quantitative estimates of property changes, and to limit ranges of non-unique outcomes of the inversion process. However, simultaneous 4D inversion is still subject to development and improvement in order to provide reliable and realistic determination of the changes in the properties of a formation including a hydrocarbon reservoir producing oil and/or gas.

SUMMARY

Methods and devices according to various embodiments perform simultaneous geostatistical inversion of time-lapse seismic data.

According to an embodiment, there is a method for geostatistical inversion of time-lapse data. The method includes receiving at least two seismic datasets acquired at different survey times, respectively, over at least partially overlapping areas. The method then includes performing simultaneous geostatistical inversion of the at least two datasets to obtain realizations of parameters characterizing one or more underground structures repeatedly surveyed when acquiring the at least two seismic datasets, the realizations being compatible with the at least two acquired seismic datasets. The method further includes assembling the realizations to estimate evolution of the parameters in the one or more underground structures as a basis for hydrocarbon production-related decisions.

According to another embodiment, there is a seismic data processing apparatus including a communication interface and a data processing unit. The communication interface is configured to receive at least two seismic datasets acquired at different survey times, respectively, over at least partially overlapping areas. The data processing unit is connected to the communication interface configured: to perform simultaneous geostatistical inversion of the at least two datasets to obtain realizations of parameters characterizing one or more underground structures repeatedly surveyed when acquiring the at least two seismic datasets, the realizations being compatible with the at least two acquired seismic datasets, and to assembly the realizations to estimate evolution of the parameters in the one or more underground structures as a basis for hydrocarbon production-related decisions.

According to yet another embodiment, there is a non-transitory computer readable medium storing executable codes which, when executed by a processor having access to at least two seismic datasets acquired at different survey times, respectively, over at least partially overlapping areas, make the processor to perform simultaneous geostatistical inversion of the at least two datasets (1) to obtain realizations of parameters characterizing one or more underground structures repeatedly surveyed when acquiring the at least two seismic datasets, the realizations being compatible with the at least two acquired seismic datasets, and (2) to assembly the realizations to estimate evolution of the parameters in the one or more underground structures as a basis for hydrocarbon production-related decisions.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology of land seismic surveys. However, the inventive concepts to be discussed next are not limited to land seismic surveys, but may also be applied for marine seismic surveys and surveys with electromagnetic waves.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2:
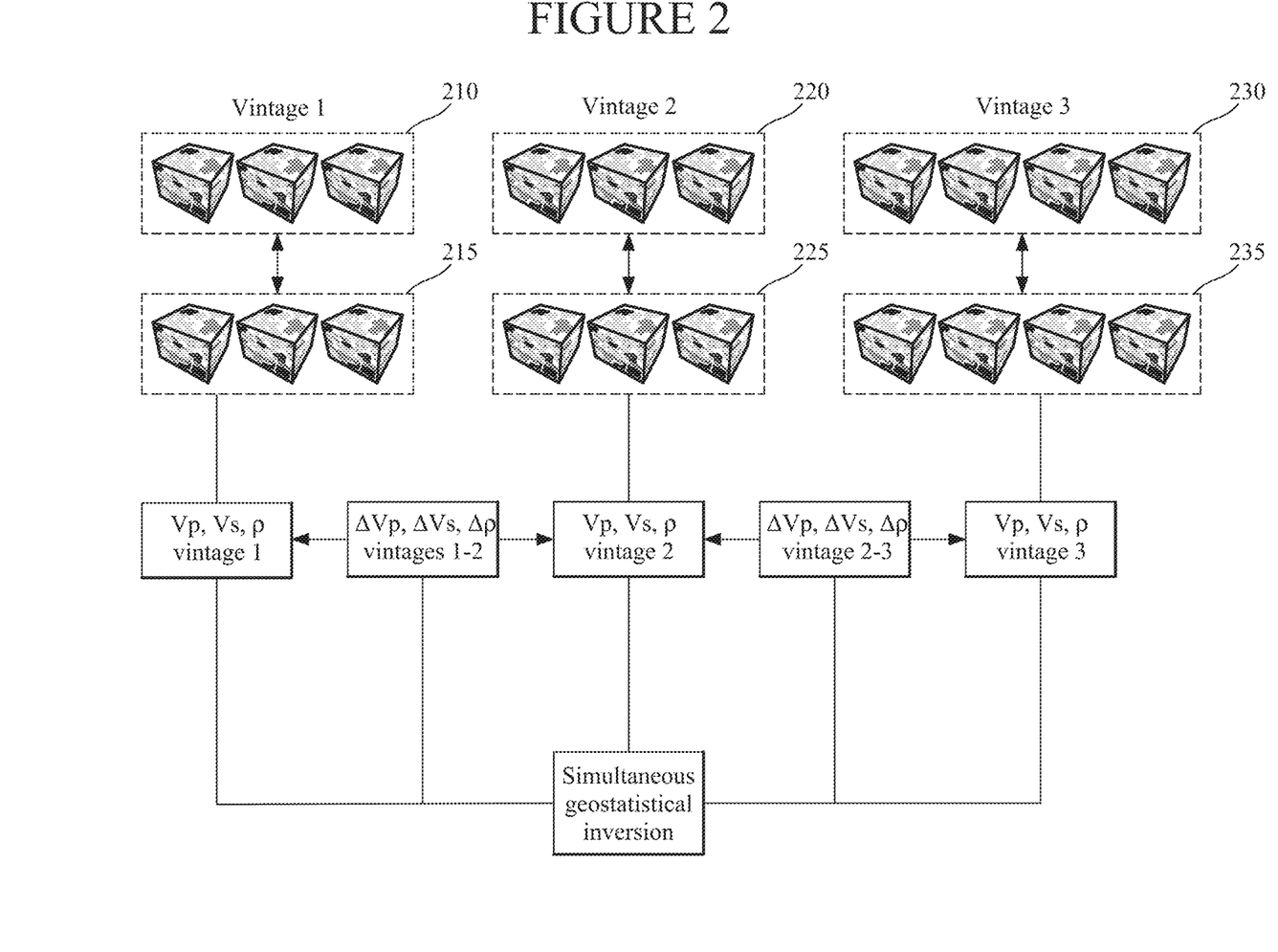
FIG. 2 is a schematic representation of simultaneous geostatistical inversion of plural vintages according to an embodiment.

FIG. 2 is a schematic representation of geostatistical inversion of time-lapse data according to an embodiment. Seismic datasets 210, 220 and 230 ("vintages") acquired during seismic surveys performed at different survey times include data carrying information about volumes repeatedly surveyed (not labeled individually). One may say that the surveys during which the vintages were acquired were performed over at least partially overlapping areas because there are volumes repeatedly surveyed under the areas surveyed in different vintages, but it is possible the individual surveys to also cover uncommon areas.

Although FIG. 2 illustrates three vintages, the number of vintages is merely illustrative and not limiting, i.e., two, four or more vintages may be used. The location and number of the seismic volumes does not need to be the same for each vintage. FIG. 2 indicates the elastic properties values for volumes in the surveyed underground formation at the survey times (i.e., when the seismic data are collected). These elastic properties values can be used for generating the synthetic seismic data 215, 225 and 235 corresponding to the volumes surveyed in each vintage. If the number of available seismic vintages is N (three in the figure), there are N−1 (two in the figure) variations of the elastic properties values between consecutive vintages. These variations are referred to as delta (or Δ) properties in the rest of this document.

During simultaneous geostatistical inversion, the set of elastic properties values for one reference vintage of choice, for example, $V_p$, $V_s$, $\rho$ for vintage 1, and the deltas of the properties for the other vintages are obtained. Prior information, in the form of pdfs and variograms, may be specified for the reference elastic properties values and for all deltas, so that N sets of prior information are used. The variations of the elastic properties are induced by the hydrocarbon field being produced. As such, prior information can be more reliably obtained for deltas than for absolute values of the elastic properties, which combine the reference values with the effects of production. Various methods may be employed to infer prior information for deltas. For example, when production causes changes of fluid saturations, well log curves and rock physics models may be used to account for fluid substitution when calculating expected measurements in the wells. Statistical analysis may then be performed on the difference in calculated values for well curves and be used as prior information for the geostatistical inversion. The elastic properties values for each vintage may be readily calculated from the reference elastic properties values and the deltas of the elastic properties. In the example illustrated in FIG. 2, if vintage 1 is chosen as the reference, the elastic properties values for vintage 2 are calculated as:

$$V_p^{(2)} = V_p^{(1)} + \Delta V_p^{(1-2)}$$

$$V_s^{(2)} = V_s^{(1)} + \Delta V_s^{(1-2)}$$

$$\rho^{(2)} = \rho^{(1)} + \Delta \rho^{(1-2)} \quad (1)$$

Further, the elastic properties values for vintage 3 are:

$$V_p^{(3)} = V_p^{(2)} + \Delta V_p^{(2-3)} = V_p^{(1)} + \Delta V_p^{(1-2)} + \Delta V_p^{(2-3)}$$

$$V_s^{(3)} = V_s^{(2)} + \Delta V_s^{(2-3)} = V_s^{(1)} + \Delta V_s^{(1-2)} + \Delta V_s^{(2-3)}$$

$$\rho^{(3)} = \rho^{(2)} + \Delta \rho^{(2-3)} = \rho^{(1)} + \Delta \rho^{(1-2)} + \Delta \rho^{(2-3)} \quad (2)$$

The synthetic seismic data corresponding to each vintage can then be modeled using the elastic properties values for each vintage as described previously for the conventional geostatistical inversion. The simultaneous geostatistical inversion generates realizations of elastic properties for all vintages in a single process, based on the prior information for the elastic properties for the reference vintage and for the delta elastic properties, and these realizations are compatible with the seismic data for all vintages.

Figure 3:
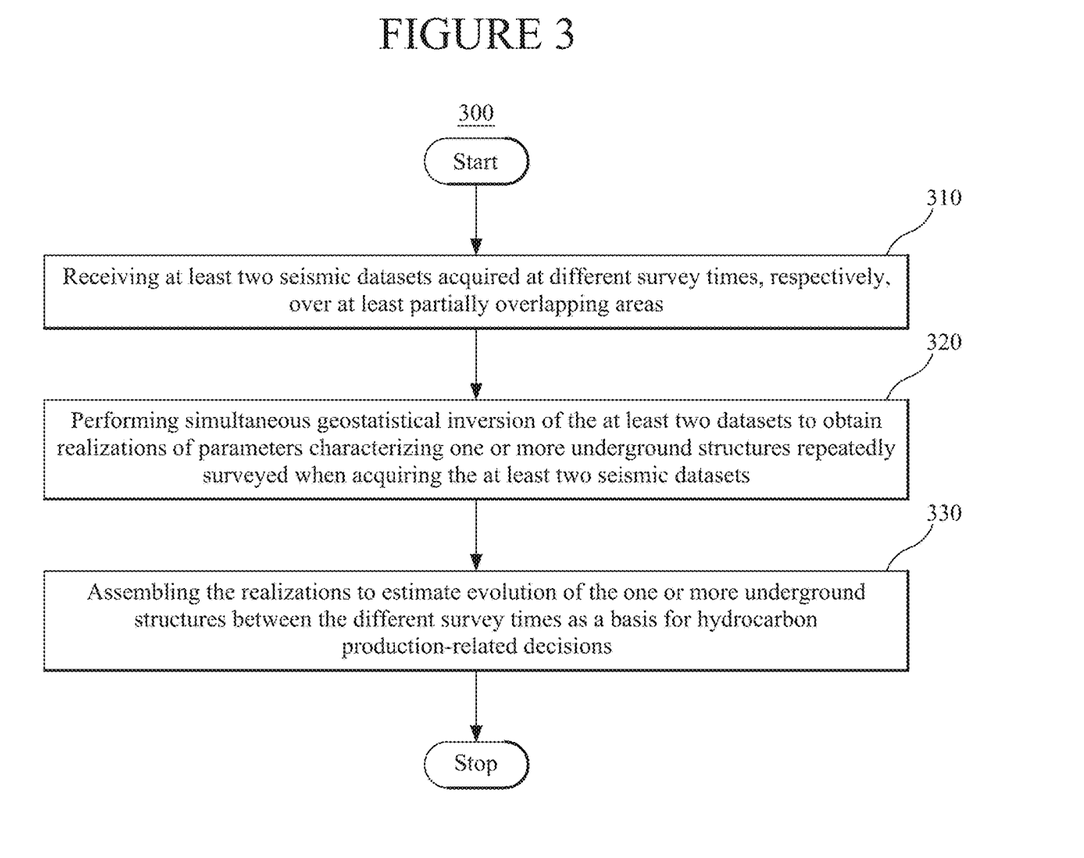
FIG. 3 is a flowchart of a method according to an embodiment.

FIG. 3 is a flowchart of a method 300 for geostatistical inversion of time-lapse data, according to an embodiment. Method 300 includes receiving at least two seismic datasets (e.g., 210, 220, 230) acquired at different survey times, respectively, over at least partially overlapping areas, at 310. Being acquired over at least partially overlapping areas implies that there are volumes of the underground formation (i.e., underground structures) surveyed repeatedly.

Method 300 further includes performing simultaneous geostatistical inversion of the datasets, at 320, to obtain realizations of parameters characterizing underground structure(s) repeatedly surveyed. The realizations are compatible with the seismic datasets. The realizations are then combined to estimate evolution of the underground structure(s) at 330. That is, each realization yields a value for each parameter in each vintage. Assembling the realizations yields a likely range for each parameter in each vintage with probability of the parameter values varying within the respective range. Knowledge of the parameters' evolution (e.g., the parameters' ranges from vintage to vintage) is a basis of hydrocarbon production-related decisions. Such decisions may include forecasting further evolution, evaluation of productivity and efficiency for various equipment setups, etc.

Figure 4:
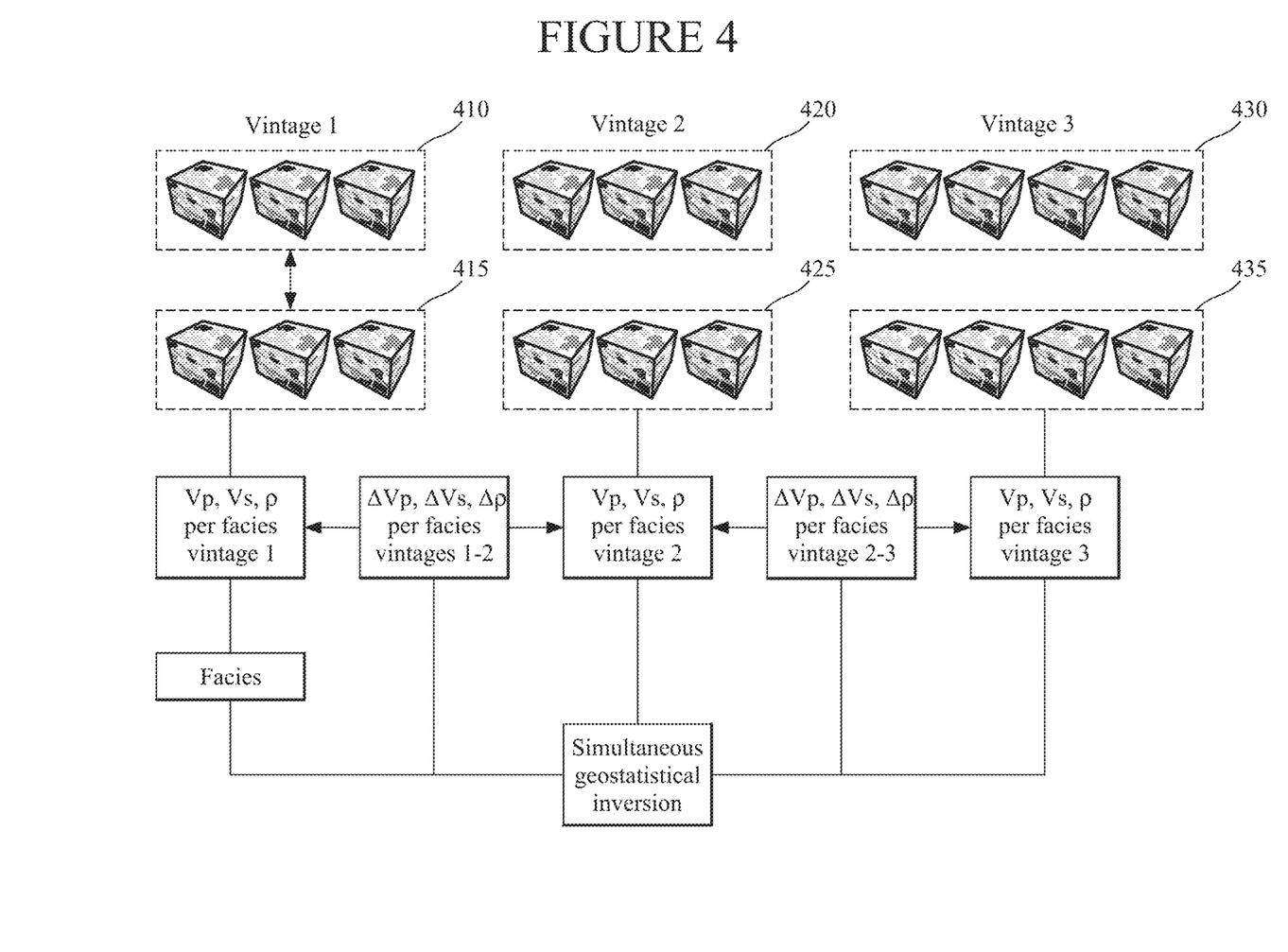
FIG. 4 is a schematic representation of simultaneous geostatistical inversion of plural vintages according to another embodiment.

FIG. 4 is a schematic representation of simultaneous geostatistical inversion of plural vintages according to another embodiment. In this embodiment, facies are jointly inverted with elastic properties. A facies is a rock unit with specified coherent elastic characteristics. Different facies react differently when traversed by seismic excitations. An example of facies modeling in a clastic sedimentary structure are sand and shale rock units. For geostatistical inversion, different prior information in the form of pdfs and/or variograms may be specified for the elastic properties corresponding to different facies. Additionally, discrete prior probabilities and variograms are also specified to model the spatial distribution of the facies themselves. Prior information is required for a set of elastic properties for one reference vintage of choice and the delta properties, but the same type of prior information is provided also for each facies. Therefore, if the number of facies is M, there are N×M sets of elastic properties (e.g., Vp, Vs, ρ or a Δ thereof) requiring prior information.

The pdf may be represented using a Dirac delta function for the delta properties corresponding to some of the facies. In other words, the delta properties may be fixed to zero for some of the facies, with their elastic properties remaining the same for all the vintages. This approach can be applied when it is known that the properties of some facies are not modified by hydrocarbon production. As an example, in a clastic sedimentary environment, it can often be assumed that production does not induce any change in the elastic properties of shale and brine-filled sands.

The simultaneous geostatistical inversion illustrated in FIG. 4 generates realizations of facies and elastic properties for all vintages in a single process. The seismic data 410, 420 and 430 are honored by synthetic data 415, 425 and 435, respectively, for the different realizations.

Figure 5:
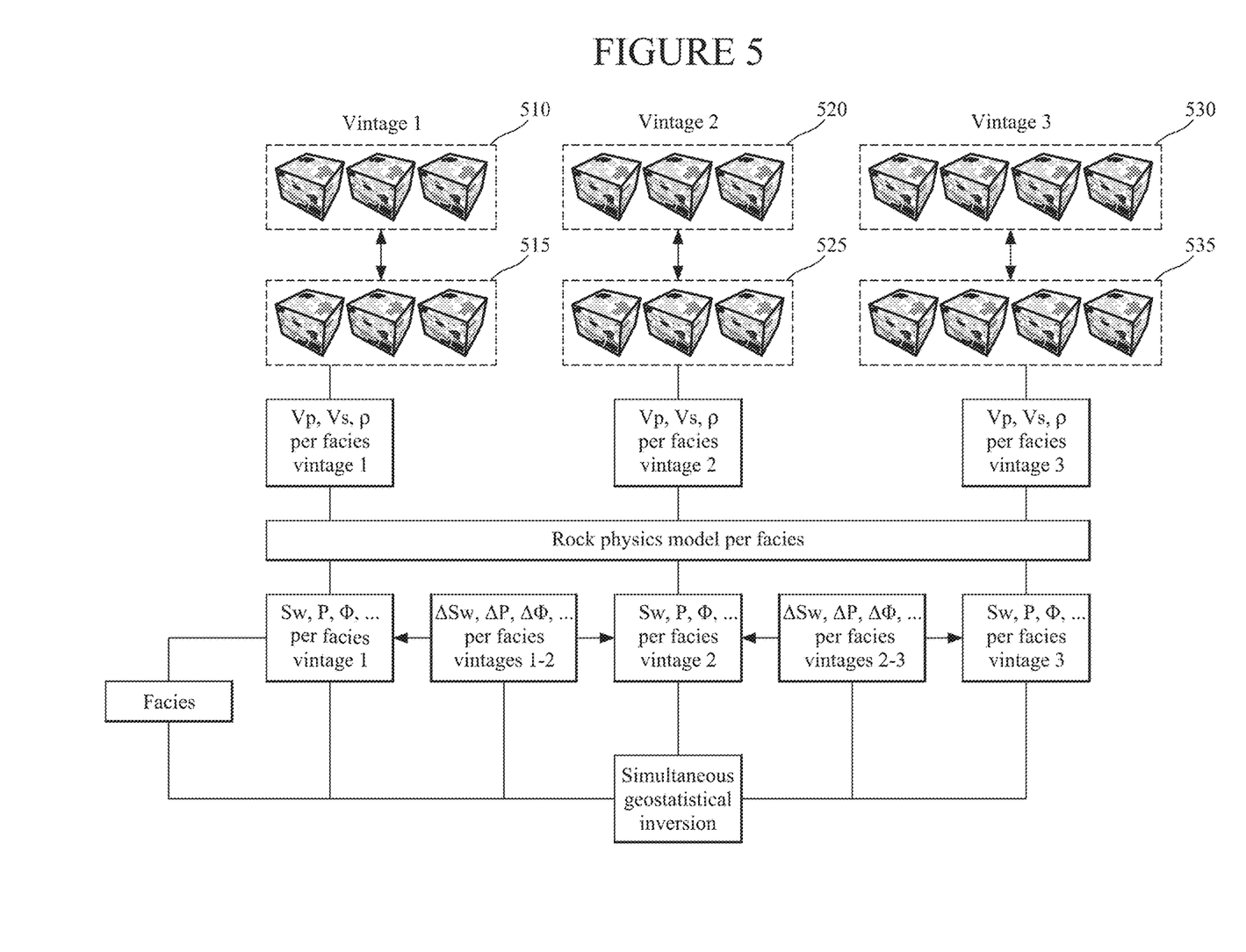
FIG. 5 is a schematic representation of simultaneous geostatistical inversion of plural vintages according to yet another embodiment.

Another embodiment of geostatistical inversion of time-lapse data is schematically illustrated in FIG. 5. Here, reservoir properties and not the elastic properties are inverted jointly with the facies. Reservoir properties (also known as petrophysical or engineering properties) are the physical, mechanical and chemical-related properties of the rocks with the fluids they contain. These are the properties ultimately of interest to geoscientists and reservoir engineers for a better understanding of the reservoir and prediction of its quality and performance. Typical reservoir properties include, but are not limited to, porosity, fluid saturations, permeability, fraction of clay, pore pressure and temperature. When hydrocarbons are removed from a reservoir, pore pressure and/or fluid saturations are the properties that most significantly change with time. In specific contexts, other reservoir properties can also vary; for example, temperature when steam-assisted gravity drainage (SAGD) technologies are being used to produce heavy oil, or porosity in chalk fields undergoing compaction during production.

Rock physics models are transforms (such as a set of equations) aiming at predicting the elastic properties of a rock unit from its reservoir properties. The field of rock physics modeling is very diverse and is based on various theories and empirical results. Those skilled in the art often start from known formulas and adjust them to the specific characteristics of the field of interest in order to obtain custom-made rock physics models. Since the goal is to model the elastic response of the underground structure(s), rock physics models are typically different for different facies. The geostatistical inversion illustrated in FIG. 5 directly inverts reservoir properties (i.e., $S_w$, P, $\Phi$, corresponding respectively to water saturation, pore pressure and porosity) and facies for all vintages. Similar to the embodiment illustrated in FIG. 4, discrete prior probabilities and variograms are specified to model the spatial distribution of the facies. But instead of priors for elastic properties, prior information (pdfs and variograms) is specified for a set of reservoir properties for one reference vintage of choice and for $\Delta$s of the reservoir properties for each facies.

N×M sets of reservoir properties thus require prior information, in addition to the facies. FIG. 5 indicates $S_w$, P, $\Phi$ (corresponding respectively to water saturation, pore pressure and porosity) as reservoir properties, but other embodiments may use other reservoir properties. Similar to the method illustrated in FIG. 4, in the method illustrated in FIG. 5 some of the deltas can be fixed to zero for some or all of the facies. For example, $\Delta\Phi=0$ if production is not expected to impact porosity. The elastic properties for each vintage can be calculated from the reservoir properties using the appropriate rock physics model. The synthetic seismic data can be generated using sets of values according to different realizations. Various rock physics models may be employed. The simultaneous geostatistical inversion generates realizations of facies and reservoir properties for all vintages in a single process. The seismic data 510, 520 and 530 are honored by synthetic data 515, 525 and 535, respectively, for the different realizations.

Figure 6:
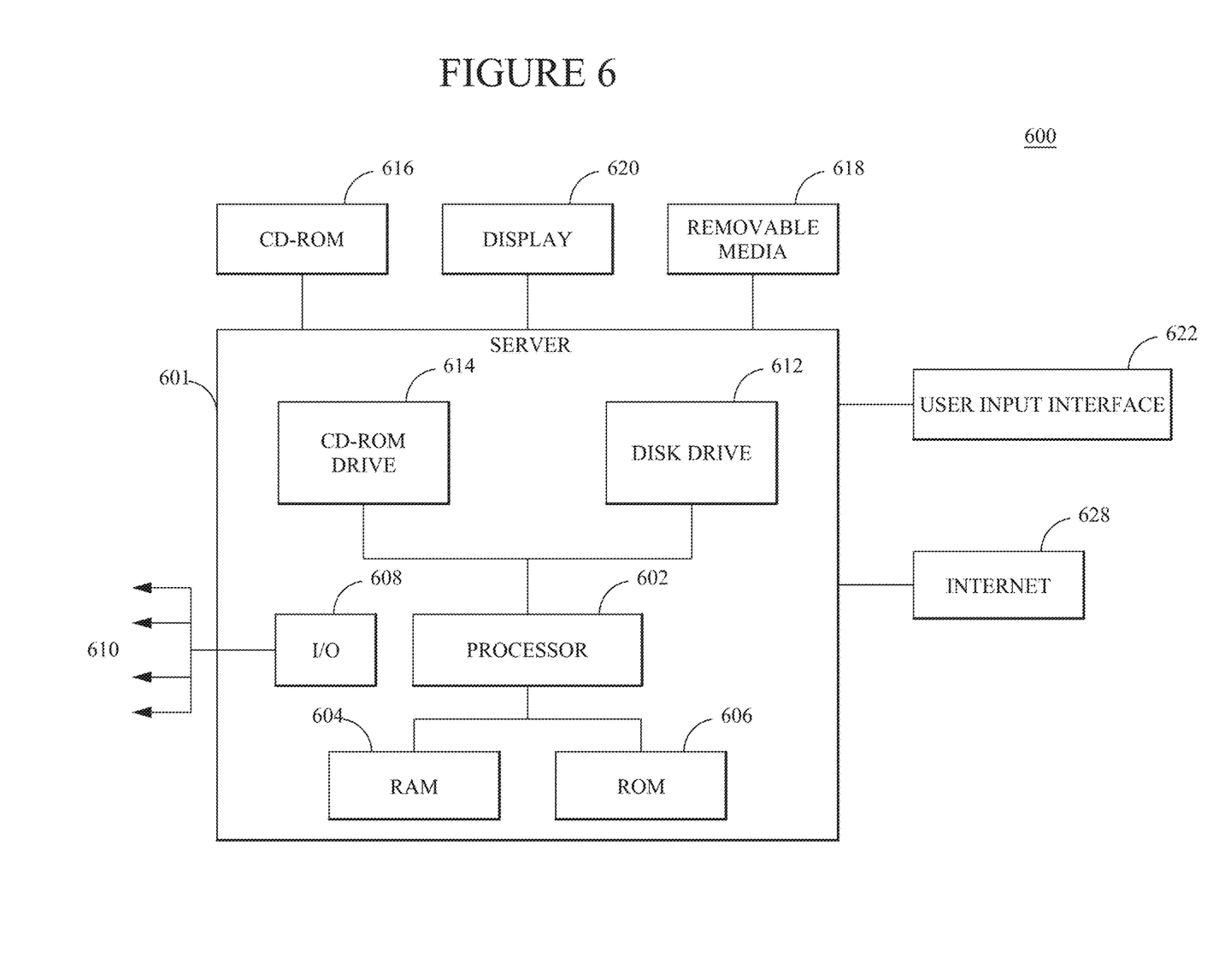
FIG. 6 is a schematic diagram of a seismic data processing apparatus according to an embodiment.

The above-discussed methods may be implemented in a computing device 600 as illustrated in FIG. 6. Hardware, firmware, software or a combination thereof may be used to perform the various steps and operations described herein.

Exemplary computing device 600 suitable for performing the methods described in this section includes a server 601 with a central processor (CPU) 602 coupled to a random access memory (RAM) 604 and to a read-only memory (ROM) 606. Memory 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various computing devices.

In addition to being applicable to process time-lapse seismic surveys, the present inventive concept is also applicable to multicomponent and/or azimuthally sectored time-lapse seismic data. For multicomponent data, P-P and P-S converted-wave seismic volumes may be available for some or all of the time-lapse vintages, and the inverted properties are the same as for the above-described methods. When the seismic data corresponds to a wide range of source-to-receiver azimuths, it can be divided into azimuth sectors for some or all of the time-lapse vintages. The variations between azimuth sectors contain information about the anisotropy of the explored formation. The geostatistical inversion is then applied to simultaneously invert for the anisotropic elastic properties described in P. Mesdag, H. Debeye, R. Bornard, "Method and Device for the Generation and Application of Anisotropic Elastic Parameters in Horizontal Transverse Isotropic (HTI) Media," International Patent Application No. WO2015014762. In another embodiment related to azimuthally sectored time-lapse seismic data, the direction of anisotropy and properties related to the magnitude of the anisotropy are included as part of the inverted reservoir parameters.

As mentioned in the Background section, conventional methods invert base and monitor surveys separately and then calculate differences to emphasize the changes in elastic properties, use inversion results for a base survey to define an initial model for inverting a monitor survey, or invert seismic amplitude differences directly for evaluating the changes of elastic properties. A separate inversion of the vintages, with or without using a previous inversion result as an initial model, does not provide any control over the difference in inverted properties between vintages and, therefore, tends to give noisy results. Inverting differences in seismic amplitudes between vintages relies on the implicit assumption that the Zoeppritz reflectivity equations or their approximations can be used to model the seismic difference from the elastic property difference. This assumption would be valid if the Zoeppritz equations were linear, but they are in fact not linear.

The large redundancy of information between multiple surveys renders inverting all vintages simultaneously a better approach to obtain robust quantitative estimates of elastic properties and their variations. This approach has been explored in the context of deterministic inversion, for example in Y. Lafet, B. Roure, P. M. Doyen, R. Bornard, H. Buran, "Global 4-D seismic inversion and time-lapse fluid prediction," 11th International Congress of the Brazilian Geophysical Society, 24 Aug. 2009 (2009-08-24), pages 1-4, XP055193941, and in Y. Lafet, L. Michou, B. Roure, R. Bornard, "Time-Lapse Simultaneous Inversion of Amplitudes and Time Shifts Constrained by Pre-Computed Input Maps," International Patent Application No. WO2015092542. The benefits of simultaneous 4D geostatistical inversion over simultaneous 4D deterministic inversion are the same as the benefits of geostatistical inversion over deterministic inversion in general. These benefits include the possibility of directly quantifying uncertainty using the generated realizations, results with high vertical detail (rather than limited to seismic bandwidth) that are ready for input to reservoir flow simulation, and the direct inversion of facies.

The disclosed exemplary embodiments provide methods and devices for simultaneous geostatistical inversion of time-lapse data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for geostatistical inversion of time-lapse data, the method comprising:
   receiving at least two seismic datasets acquired at different survey times, respectively, over at least partially overlapping areas;
   performing simultaneous geostatistical inversion of the at least two datasets to obtain realizations of parameters that characterize one or more underground structures, the one or more underground structures being repeatedly surveyed when acquiring the at least two seismic datasets, and the realizations being compatible with the at least two acquired seismic datasets; and
   estimating evolution of the parameters in the one or more underground structures using the realizations, the evolution being used as a basis for hydrocarbon production-related decisions.

2. The method of claim 1, wherein the parameters are elastic parameters and include P-wave velocity, S-wave velocity and density.

3. The method of claim 1, wherein the simultaneous geostatistical inversion yields for each realization a set of values of the elastic parameters for one of the at least two seismic datasets and changes of the elastic parameters relative to the set of values for other of the at least two seismic datasets.

4. The method of claim 1, wherein the parameters are associated with facies inside the underground structures, so as parameter values inside each facies are coherent.

5. The method of claim 4, further comprising:
   using rock physics models per facies to convert into elastic parameters values inside each facies other properties values that are likely to change between the survey times, and the simultaneous geostatistical inversion yields realizations of the other properties values.

6. The method of claim 5, wherein the other properties values correspond to one or more of porosity, fluid saturations, permeability, fraction of clay, pore pressure, temperature.

7. The method of claim 1, wherein the simultaneous geostatistical inversion uses probability density functions and/or variograms as prior information for the parameters.

8. The method of claim 1, wherein at least some of the at least two seismic datasets are divided in azimuth sectors, variation of the parameters among the azimuth sectors yielding information about local anisotropy.

9. A seismic data processing apparatus comprising:
   a communication interface configured to receive at least two seismic datasets acquired at different survey times, respectively, over at least partially overlapping areas; and
   a data processing unit connected to the communication interface and configured
   to perform simultaneous geostatistical inversion of the at least two datasets to obtain realizations of parameters that characterize one or more underground structures, the one or more underground structures being repeatedly surveyed when acquiring the at least two seismic datasets, and the realizations being compatible with the at least two acquired seismic datasets, and
   to estimate evolution of the parameters in the one or more underground structures using the realizations, the evolution being then used as a basis for hydrocarbon production-related decisions.

10. The apparatus of claim 9, wherein the parameters are elastic parameters and include P-wave velocity, S-wave velocity and density.

11. The apparatus of claim 9, wherein the simultaneous geostatistical inversion yields for each realization a set of values of the elastic parameters for one of the at least two seismic datasets and changes of the elastic parameters relative to the set of values for other of the at least two seismic datasets.

12. The apparatus of claim 9, wherein the parameters are associated with facies inside the underground structures, so as parameter values inside each facies are coherent.

13. The apparatus of claim 12, wherein the data processing unit is further configured to use rock physics models per facies to into convert elastic parameters values inside each facies other properties values that are likely to change between the survey times, and the simultaneous geostatistical inversion yields realizations of the other properties values.

14. The apparatus of claim 13, wherein the other properties values correspond to one or more of porosity, fluid saturations, permeability, fraction of clay, pore pressure, temperature.

15. The apparatus of claim 9, wherein the simultaneous geostatistical inversion uses probability density functions and/or variograms as prior information for the parameters.

16. The apparatus of claim 9, wherein the data processing unit is also configured to divide at least some of the at least two seismic datasets in azimuth sectors, variation of the parameters among the azimuth sectors yielding information about local anisotropy.

17. The apparatus of claim 9, further comprising:
a display connected to the data processing unit configured to illustrate realizations of the parameters as cross-sections or volumes of an explored formation.

18. A non-transitory computer readable medium storing executable codes which, when executed by a processor having access to at least two seismic datasets acquired at different survey times, respectively, over at least partially overlapping areas, make the processor:
to perform simultaneous geostatistical inversion of the at least two datasets to obtain realizations of parameters that characterize one or more underground structures, the one or more underground structures being repeatedly surveyed when acquiring the at least two seismic datasets, and the realizations being compatible with the at least two acquired seismic datasets; and
to estimate evolution of the parameters in the one or more underground structures using the realization, the evolution being then used as a basis for hydrocarbon production-related decisions.

19. The non-transitory computer readable medium of claim 18, wherein
the simultaneous geostatistical inversion yields for each realization a set of values of the parameters for one of the at least two seismic datasets and changes of the elastic parameters relative to the set of values for other of the at least two seismic datasets.

20. The non-transitory computer readable medium of claim 18, wherein the parameters are associated with facies inside the underground structures, so as parameter values inside each facies are coherent, and the processor further uses using rock physics models per facies to convert into elastic parameters values inside each facies other properties values that are likely to change between the survey times, and the simultaneous geostatistical inversion yields realizations of the other properties values.

* * * * *